Patented Apr. 14, 1931

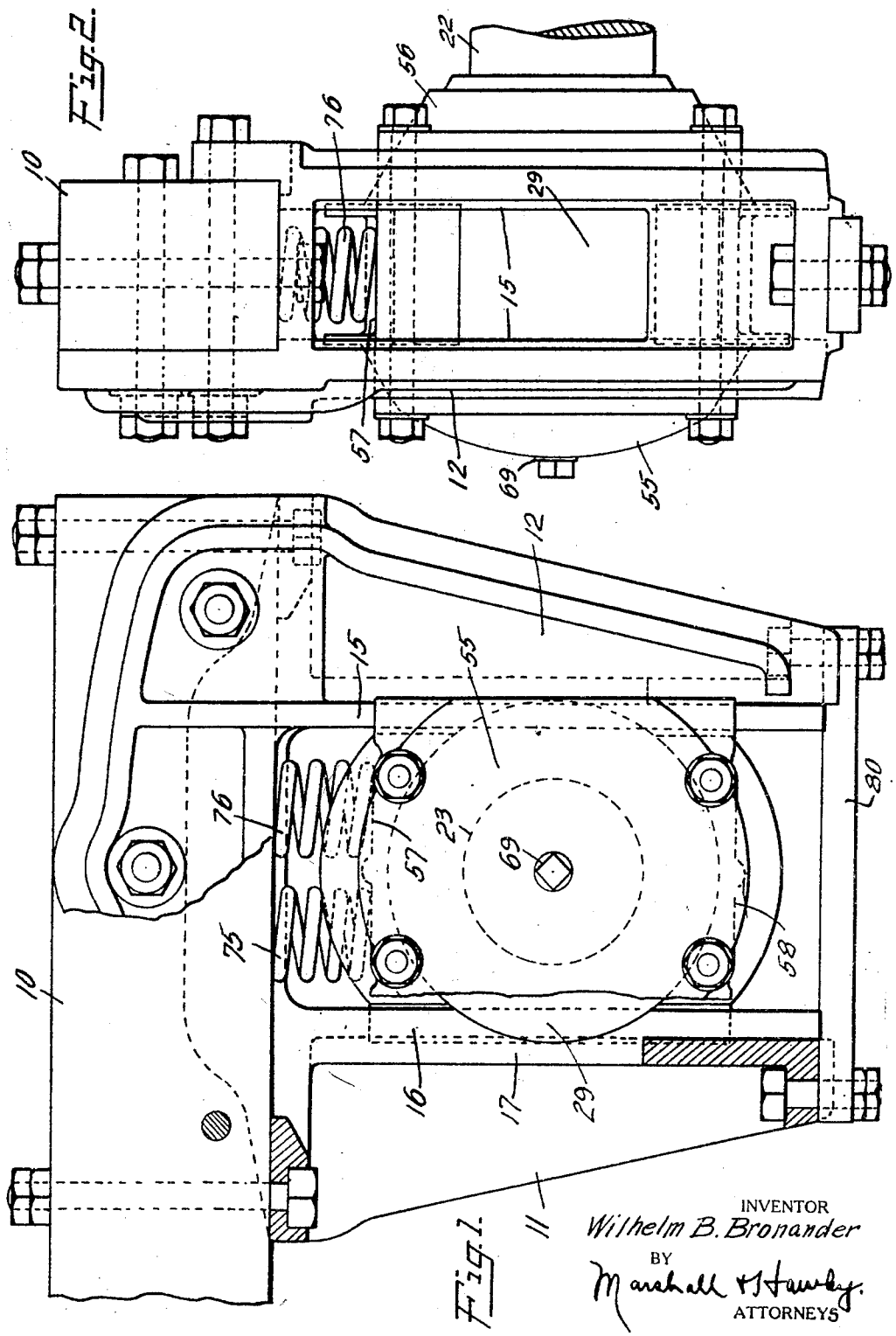

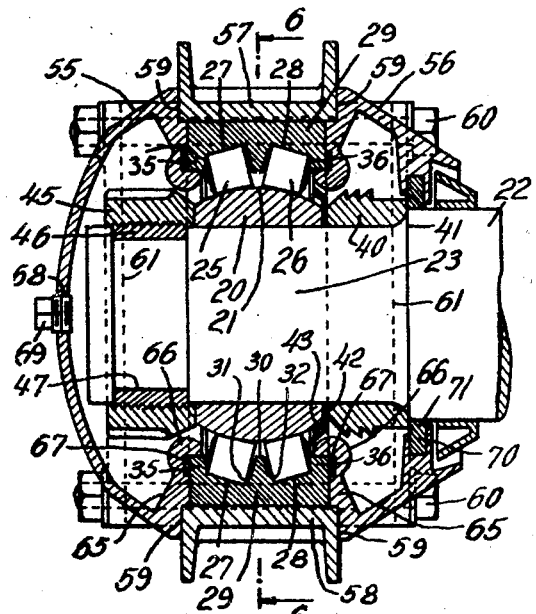

1,800,246

UNITED STATES PATENT OFFICE

WILHELM B. BRONANDER, OF MONTCLAIR, NEW JERSEY

ROLLER BEARING AND MOUNTING THEREFOR

Application filed June 11, 1927. Serial No. 198,110.

This invention relates to roller bearings and to roller bearing mountings.

The roller bearing and mounting embodying the invention have been particularly developed for heavy vehicles, such as railway trucks and the invention has for its salient object to provide an efficient bearing and a simple and practical mounting for the bearing.

Another object of the invention is to provide a mounting so designed that the bearing can be easily and readily assembled in and removed from its mounting.

Another object of the invention is to provide a bearing so constructed and arranged that it can be reversed, thus lengthening the life of a bearing.

Further objects of the invention will appear from the following specification taken in connection with the drawings, which form a part of this application, and in which Fig. 1 is an elevational view partly in section and partly broken away showing the manner in which the bearing is mounted on a pedestal or supporting frame of a truck;

Fig. 2 is an end elevation of the structure shown in Fig. 1;

Fig. 3 is a vertical sectional elevation of a bearing constructed in accordance with the invention;

Fig. 4 is an end elevation of the structure shown in Fig. 3, the axle being shown in section;

Fig. 5 is a view partly in section and partly in top plan showing the bearing illustrated in Fig. 3; and Fig. 6 is a sectional elevation taken substantially on line 6—6 of Fig. 3.

The invention briefly described consists of a roller bearing of suitable construction and comprising an inner race and an outer race and rollers mounted between the races. The bearing is mounted between vertical guide frames of a pedestal, the outer race being rotatably mounted in a channel in the pedestal or frames and means being provided on opposite sides of the bearing for slidably supporting the bearing on the pedestal. The bearing may, if desired be fixedly supported in the frames of the pedestal. In the particular form of the invention shown, the bearing block is mounted above and below the outer race, these blocks being retained in position by securing means passing through the blocks and the casing which encloses the bearing. Further details of the invention will appear from the following description.

Figs. 1 and 2 illustrate the manner of mounting the bearing on a truck, such as a railway truck. In these views, there is shown a horizontal frame member 10 which has secured thereto a pair of vertical frame members 11 and 12 which form the pedestal in which the bearing is mounted.

Each vertical frame member as shown in section in Fig. 5 has vertically extending, spaced portions 15 and 16, a vertical channel 17 being disposed between the portions 15 and 16.

Any suitable form of roller bearing may be utilized and in the form of the invention shown in Figs. 3 to 6 inclusive, there is illustrated a self-centering bearing comprising an inner race 20 having an outer spherical bearing surface 21, the race 20 being mounted on the wheel axle 22. Two sets of conical rollers 25 and 26 engage the spherical surface 21 of the inner race 20 and engage oppositely inclined conical surfaces 27 and 28 of an outer ball race 29. The race 29 has a central inwardly extending rib 30 having surfaces 31 and 32 which form abutments for the inner surfaces of the rollers 25 and 26. The race 29 also has inwardly extending flanges 35 and 36 against which the outer ends of the rollers 25 and 26 bear.

The axle 22 is reduced as shown at 23 and a collar 40 is mounted on the reduced portion and abuts against a shoulder 41. A washer 42 having an inclined flange 43 at the outer periphery thereof is mounted between the collar 40 and the inner bearing race 20.

The race 20 is held in place by a collar or nut 45 which is threaded on a split or two-part threaded sleeve or ring 46 mounted in an annular groove 47 formed adjacent the outer end of the axle 22.

From the showing particularly in Fig. 5 it will be noted that the outer ball race 29 is disposed within the annular grooves 17 of the guide frames 11 and 12 and abuts at its side faces against the walls 50 and 51 of the grooves 17.

The bearing is enclosed by end plates or cover plates 55 and 56 held in spaced relation by blocks 57 and 58 which seat against shoulders 59 formed in the end plates. The blocks are disposed above and below and in engagement with the outer ball race 29, sufficient clearance between these parts being provided so that the ball race can rotate within the blocks 57 and 58. The end or cover plates 55 and 56 are secured to the blocks by means of bolts 60 which extend through the cover plates and through the blocks as shown in Figs. 3 and 6.

The plates or covers 55 and 56 are provided with vertically extending angle irons 61 which as shown in Fig. 5 extend along two sides of the portions 15 and 16 of the guide frames 11 and 12, it being understood that the plates or covers 55 and 56 are so spaced by the blocks 57 and 58 that the angle irons are in sliding engagement with the portions 15 and 16 of the frames.

The cover plates are also provided with inwardly extending webs 65 having flanged portions 66 extending laterally therefrom and adapted to extend over the flanges 35 and 36 of the ball race 29. Packing 67 is interposed between the webs 65 and the ball race to retain lubricant within the bearing.

The outer cover 55 has an opening 68 and plug 69 to provide for the insertion of lubricant into the bearing.

The cover 56 also has formed therein a recess 70 in which is disposed a packing ring 71 to prevent the escape of lubricant.

In Figs. 1 and 2 springs 75 and 76 are mounted between the frame 10 and the block 57 although it should be understood that the springs may be connected between the truck frame and the bearing in any other suitable manner as desired.

The bearing is assembled in the following manner. The inner cover 56 is first placed on the axle 22 and the collar 40 is then placed on the axle against the shoulder 41. The inner and outer races and the rollers are then assembled and placed on the axle and are held thereon by the nut or sleeve 45 which is threaded on the split threaded ring or collar 46. The blocks 57 and 58 are then placed above and below the ball race and the cover 55 is secured to the blocks and cover 56 by the bolts 60. The assembled bearing is then moved vertically in the guide frames 11 and 12. If desired, a cross bar 80 can be secured as shown in Figs. 1 and 2 across the lower ends of the frames 11 and 12 to hold these frames in position.

From the foregoing description it will be seen that a simple and practical bearing and a simple and practical mounting for the bearing has been designed. It will be evident that the bearing is self-alining and that tilting movement between the axle and the bearing will be permitted by the spherical surface 21 of the inner ball race 20. Furthermore, it will be evident from the construction of the bearing that the bearing can be reversed end for end if desired.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:—

1. A roller bearing mounting comprising a pair of inwardly facing vertical guide frames, a roller bearing mounted between said frames, said bearing comprising an inner race and an outer race, and rollers mounted between and engaging said races and end plates secured to the bearing and having flanges overlapping said guide frames.

2. A roller bearing mounting comprising a pair of inwardly facing vertical guide frames, each frame having spaced vertical bearing surfaces and a channel therebetween, a roller bearing having an outer race mounted in said channel, and means slidably engaging said vertical surfaces for enclosing said bearing.

3. A roller bearing mounting comprising a pair of inwardly facing vertical guide frames, each frame having spaced vertical bearing surfaces and a channel therebetween, a roller bearing having an outer race rotatably mounted in said channel, and means slidably engaging said vertical surfaces for enclosing said bearing.

4. A roller bearing mounting comprising a pair of inwardly facing vertical guide frames, each frame having spaced vertical bearing surfaces and a channel therebetween, a roller bearing having an outer race extending into said channels and a bearing block mounted above and below said outer race.

5. A roller bearing mounting comprising a pair of inwardly facing vertical guide frames, each frame having spaced vertical bearing surfaces and a channel therebetween, a roller bearing having an outer race extending into said channel, means slidably engaging said vertical surfaces for enclosing said bearing, and bearing blocks engaging said outer race disposed above and below said race and carried by said enclosing means.

6. In combination, a pair of vertical, spaced frame members having vertical channels therein, a roller bearing having an outer race mounted between said frames and disposed in said channels, and means slidably engaging the outer surfaces of said frames and securing the bearing in position between the frames.

7. In combination, a pair of vertical, spaced frame members, a roller bearing mounted between said frames, means slidably engaging the outer surfaces of said frames and securing the bearing in position between the frames, and spacing blocks disposed between said securing means.

8. In combination, a pair of vertical, spaced frame members, a roller bearing mounted between said frames, means slidably engaging the outer surfaces of said frames and securing the bearing in position between the frames, and spacing blocks disposed between said securing means and between said frames.

9. In combination, a pair of vertical spaced frame members, a roller bearing mounted between said frames, means slidably engaging the outer surfaces of said frames and securing the bearing in position between the frames, and spacing blocks disposed between said securing means and between said frames and disposed above and below said ball race.

10. A roller bearing mounting comprising a pair of inwardly facing vertical guide frames, each frame having spaced vertical bearing surfaces and a channel therebetween, a roller bearing having an outer race rotatably mounted in said channel, and means engaging said vertical surfaces for enclosing said bearing.

11. A roller bearing mounting comprising a pair of inwardly facing vertical guide frames, each frame having spaced vertical bearing surfaces and a channel therebetween, a roller bearing having an outer race extending into said channel, means engaging said vertical surfaces for enclosing said bearing, and bearing blocks engaging said outer race disposed above and below said race and carried by said enclosing means.

12. In combination, a pair of vertical, spaced frame members, a roller bearing mounted between said frames, means engaging the outer surfaces of said frames and securing the bearing in position between the frames, and spacing blocks disposed between said securing means.

13. In combination, a pair of vertical, spaced frame members, a roller bearing including a race mounted between said frames, means engaging the outer surfaces of said frames and securing the bearing in position between the frames, and spacing blocks disposed between said securing means and between said frames and disposed above and below said race.

14. In a railway truck frame, spaced pedestals having channels therein, a wheel axle and a bearing for said axle mounted between said pedestals and including an outer race extending into said channels.

15. In a railway truck frame, spaced pedestals having channels therein, a wheel axle, a bearing for said axle mounted between said pedestals and including an outer race extending into said channels, and spacing blocks engaging said outer race above and below the bearing.

16. In a railway truck frame, spaced pedestals having channels therein, a wheel axle, a roller bearing for said axle mounted between said pedestals and including an outer race extending into said channels, and spacing blocks engaging said outer race above and below the bearing.

17. In a railway truck frame, spaced pedestals having recesses therein, a wheel axle, and a bearing for said axle mounted between said pedestals and including an outer race extending into said recesses.

18. In a railway truck frame, spaced pedestals having recesses therein, a wheel axle, a bearing for said axle mounted between said pedestals and including an outer race extending into said recesses, and spacing blocks engaging said outer race above and below the bearing.

In witness whereof, I have hereunto set my hand this 3rd day of June, 1927.

WILHELM B. BRONANDER.